US 6,739,136 B2

(12) United States Patent
Mehos et al.

(10) Patent No.: US 6,739,136 B2
(45) Date of Patent: *May 25, 2004

(54) COMBUSTION SYSTEM FOR HYBRID SOLAR FOSSIL FUEL RECEIVER

(75) Inventors: Mark S. Mehos, Boulder, CO (US); Kenneth M. Anselmo, Arvada, CO (US); James B. Moreno, Albuquerque, NM (US); Charles E. Andraka, Albuquerque, NM (US); K. Scott Rawlinson, Albuquerque, NM (US); John Corey, Melrose, NY (US); Mark S. Bohn, Golden, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/301,982

(22) Filed: Nov. 22, 2002

(65) Prior Publication Data

US 2003/0136398 A1 Jul. 24, 2003

Related U.S. Application Data

(63) Continuation of application No. 09/920,191, filed on Jul. 31, 2001, now Pat. No. 6,487,859.
(60) Provisional application No. 60/222,875, filed on Aug. 3, 2000.

(51) Int. Cl.$^7$ .................................................. F03G 6/00
(52) U.S. Cl. .................................... 60/641.15; 60/641.8
(58) Field of Search ........................... 60/641.8, 641.11, 60/641.15

(56) References Cited

U.S. PATENT DOCUMENTS

| | | | | |
|---|---|---|---|---|
| 4,166,917 A | * | 9/1979 | Dorfeld et al. | 136/259 |
| 4,335,578 A | * | 6/1982 | Osborn et al. | 60/641.8 |
| 4,911,144 A | * | 3/1990 | Godett et al. | 126/636 |
| 5,113,659 A | * | 5/1992 | Baker et al. | 60/641.8 |
| 6,487,859 B2 | * | 12/2002 | Mehos et al. | 60/641.8 |

* cited by examiner

Primary Examiner—Hoang Nguyen
(74) Attorney, Agent, or Firm—Paul J. White

(57) ABSTRACT

A combustion system for a hybrid solar receiver comprises a pre-mixer which combines air and fuel to form an air-fuel mixture. The mixture is introduced tangentially into a cooling jacket. A burner plenum is fluidically connected to the cooling jacket such that the burner plenum and the cooling jacket are arranged in thermal contact with one another. The air-fuel mixture flows through the cooling jacket cooling the burner plenum to reduce pre-ignition of the air-fuel mixture in the burner plenum. A combustion chamber is operatively associated with and open to the burner plenum to receive the air-fuel mixture from the burner plenum. An igniter is operatively positioned in the combustion chamber to combust the air-fuel mixture, releasing heat. A recuperator is operatively associated with the burner plenum and the combustion chamber and pre-heats the air-fuel mixture in the burner plenum with heat from the combustion chamber. A heat-exchanger is operatively associated and in thermal contact with the combustion chamber. The heat-exchanger provides heat for the hybrid solar receiver.

21 Claims, 2 Drawing Sheets

COMBUSTION SYSTEM FOR HYBRID SOLAR FOSSIL FUEL RECEIVER

This is a continuation of U.S. application Ser. No. 09/920,191, filed Jul. 31, 2001 now U.S. Pat. No. 6,487,859 which claims the benefit of the priority filing date under 35 U.S.C. Section 119(e) of Provisional Application Serial No. 60/222,875, filed Aug. 3, 2000, each of which is hereby incorporated by reference.

CONTRACTUAL ORIGIN OF THE INVENTION

The United States Government has rights in this invention pursuant to Contract No. DE-AC36-99GO10337 between the United States Department of Energy and the Midwest Research Institute, and pursuant to DOE Contract No. DE-AC04-94AL85000 with Sandia National Laboratories.

BACKGROUND OF THE INVENTION

1. Field of Invention

The present invention relates to hybrid solar fossil fuel receivers and, in particular, to hybrid sodium heat pipe receivers for dish/Stirling systems.

2. Description of the Related Art

Solar dish/Stirling systems continue to receive strong interest in concentrating solar research programs, because of their demonstrated high efficiency for conversion of sunlight to electricity. Potential end users have indicated that to satisfy their requirements for continuous, reliable, and economical electricity, these systems will need to be hybridized. Hybridization adds a combustor and two heat exchangers to the existing concentrator, receiver, engine, and electrical system. This addition should cost less than $300/kW to compete with its diesel alternative. In addition to this economic challenge, there is the technical challenge of efficiently firing an engine at 700° C. or more. This requires a well-designed primary heat exchanger as well as a carefully-integrated combustor and recuperator.

Over the past decade or so, a number of programs have addressed various aspects of these challenges. Most have used alkali-metal reflux receivers as the starting point. These receivers are popular because of their isothermal behavior. Their primary benefit is higher system efficiency, enabled by uniform temperature at the Stirling-engine heater heads. For hybrid systems, reflux receivers have a further benefit: they allow separate solar and fired heat-transfer surfaces, and therefore independent optimizations. Conceived nearly 20 years ago, Osborn, D. B., et al., "Solar Power Converter with Pool Boiling Receiver and Integral Heat Exchanger," U.S. Pat. No. 4,335,578, Jun. 22, 1982, alkali-metal reflux receivers have been under intensive development since about 1987. Andraka, C. E., et al., "Reflux Heat-Pipe Receivers for Dish Electric Systems," *Proceedings of the 22nd Intersociety Energy Conversion Engineering Conference*, Philadelphia, Pa., 1987; Diver, R. B., et al., "Solar Test of an Integrated Sodium Reflux Heat Pipe Receiver/Reactor for Thermochemical Energy Transport," *Journal of Solar Energy*, 1990; Andraka, C. E., et al., "Testing of Stirling Engine Solar Reflux Receivers," *Proceedings of the 28th Intersociety Energy Conversion Engineering Conference*, Atlanta, Ga., 1993; and Adkins, D. R., et al., "Heat Pipe Solar Receiver Development Activities at Sandia National Laboratories," *Proceedings of the Renewable and Advanced Energy Conference*, Maui, Hi., 1999.

In 1991, the Institute for Physics and Power Engineering (IPPE, Obninsk, Russia) reported on several sodium and NaK heat-pipe designs used to transmit power to Stirling engines. Gonnov, I. V., et al., "Design and Testing of Heat Exchangers with Liquid Metal Heat Pipes for Stirling Engines," *Proceedings of the 26th Intersociety Energy Conversion Engineering Conference*, Boston, Mass., 1991. The IPPE designs included gas-fired and solar-heated versions, all with screen wicks. The gas-fired surfaces were elaborate high-parts-count assemblies. Nominally-isothermal operation was demonstrated with metal-vapor temperatures up to 750° C. and electrical output up to 4 $kW_e$. The issues of simultaneous gas and solar (hybrid) operation were not addressed.

Also in 1991, The German Aerospace Research Establishment (DLR) Institute for Technical Thermodynamics (Stuttgart, Germany) reported on their development of a sodium heat pipe receiver with screen wicks, demonstrating transport of 32 $kW_t$ at 780° C. Laing, Doerte, et al., "Sodium Heat Pipe Solar Receiver for a SPS V-160 Stirling Engine: Development, Laboratory and On-Sun Test Results," *Proceedings of the 26th Intersociety Energy Conversion Engineering Conference*, Boston, Mass., 1991. Since then, the DLR has continued the development of its design. Laing, D., et al., "Second Generation Sodium Heat Pipe Receiver for a USAB V-160 Stirling Engine: Evaluation of On-Sun Test Results Using the Proposed IEA Guidelines and Analysis of Heat Pipe Damage," *Journal of Solar Energy Engineering*, November, 1997, and most recently, reported on first-and second-generation hybrid designs. Laing, D., et al., "Design and Test Results of First and Second Generation Hybrid Sodium Heat Pipe Receivers for Dish/Stirling Systems," *Proceedings of the ASME International Solar Energy Conference*, Albuquerque, N.Mex., 1998. The DLR hybrids are completely-integrated systems, including a Stirling engine, screen-wick heat-pipe receiver with separate solar and gas-fired surfaces, a natural-gas combustor, a brazed-fin primary heat exchanger, and a recuperator. The first system used a diffusion gas-swirl burner. It was operated for more than 60 hours, with "very acceptable" behavior. The DLR has presented results showing burner operation between about 8 and 22.8 $kW_t$, sodium vapor temperatures up to 790° C., system efficiencies up to 20% (gas only, with the aperture plugged) and combustor efficiencies up to 90%. The second DLR hybrid represents a significant re-design. It uses a lean pre-mix combustion system, chosen to reduce exhaust emissions. The engine heater tubes are relocated to simplify manufacturing.

In 1994, Thermacore reported on its first hybrid heat-pipe receiver, developed for the Cummins Power Generation 7.5 $kW_e$ dish/Stirling system. Hartenstine, J. R., et al., "Development of a Solar and Gas-Fired Heat Pipe Receiver for the Cummins Power Generation 7.5 $kW_e$ Dish/Stirling System," *Proceedings of the 29th Intersociety Energy Conversion Engineering Conference*, Washington, D.C., 1994. Thermacore's first system included a sodium heat-pipe receiver, separate solar and gas-fired surfaces, a natural-gas combustor, and an integrated recuperator. It featured nickel-powder wicks, fins milled from the heat-pipe wall, and nozzle-mixing burners. Test results (not reported in the literature) led to a second design that uses pre-mixed metal-matrix burners and circular-finned secondary heat pipes to supply heat to the primary heat-pipe solar receiver. It is believed that this system was tested successfully, although, once again, the test results are not reported in the literature.

In 1995, Stirling Technology Company (STC) reported on its development of a hybrid 10 $kW_t$ NaK pool-boiler receiver. Noble, J. E., et al., "Test Results From A 10 $kW_t$ Solar/Natural Gas Hybrid Pool Boiler Receiver," *Proceed-* ings of the 4*th* *ASME/JSME Solar Engineering Joint Conference.*, Maui, Hi., 1995. The system comprises a NaK pool boiler, separate solar and gas-fired surfaces, a natural-gas combustor, and a stand alone recuperator. The burner was a pre-mixed metal matrix type, delivering heat radiatively and convectively to the pool-boiler wall. The system was thermally loaded with a water-cooled gas-gap calorimeter. Tests were carried out with lamp heating at STC, and later with solar heating at the High Flux Solar Furnace at National Renewable Energy Laboratory (NREL). Full hybrid operation at nominally 700° C. was demonstrated during simulated natural cloud transients, with burner power varying by 2:1.

In 1995, our nascent hybrid receiver efforts were combined to develop a 75-kW$_t$ hybrid reflux receiver, with emphasis on manufacturability, cost, and lifetime. Using a ⅙th-scale gas-fired sodium heat pipe, the initial step was to select a candidate burner type and candidate gas fired surface configuration. In 1997, we reported on our study of the applicability of pre-mixed metal-matrix radiant burner technology to hybrid systems. Bohn, M. S., "Application of Radiant Burner Technology to Hybrid Dish/Stirling Systems," *ASME International Solar Energy Conference*, Washington, D.C., 1997.

However none of the foregoing art enables a fully-integrated system, including a burner, pin-fin primary heat exchanger, recuperator, solar absorber, and sodium heat pipe, which is characterized in design to avoid pre-ignition, while attaining robust heat-pipe performance, and long life of the burner matrix, recuperator, and flue-gas seals.

SUMMARY OF THE INVENTION

A combustion system for a hybrid solar receiver may comprise a pre-mixer having a first inlet for air and a second inlet for fuel. The pre-mixer combines the air and the fuel to form an air-fuel mixture. A cooling jacket is provided open to the pre-mixer on one end. The air-fuel mixture is introduced tangentially into the cooling jacket. A burner plenum is fluidically connected to the cooling jacket such that the burner plenum and the cooling jacket are arranged in thermal contact with one another. The air-fuel mixture flows though the cooling jacket cooling the burner plenum to reduce pre-ignition of the air-fuel mixture in the burner plenum. A combustion chamber is operatively associated with and open to the burner plenum. The combustion chamber receives the air-fuel mixture from the burner plenum. An igniter is operatively positioned in the combustion chamber. The igniter combusts the air-fuel mixture releasing heat. A recuperator is operatively associated with burner plenum and the combustion chamber. The recuperator pre-heats the air-fuel mixture in the burner plenum with heat from the combustion chamber. A heat-exchanger is operatively associated and in thermal contact with the combustion chamber. The heat-exchanger provides heat for the hybrid solar receiver.

A method for providing combustion heat for a hybrid solar receiver comprises 1) mixing air and fuel to form an air-fuel mixture, 2) tangentially introducing the air-fuel mixture for flowing through a cooling jacket, 3) cooling a burner plenum with the air-fuel mixture flowing through the cooling jacket, 4) heating the air-fuel mixture in the burner plenum, 5) delivering the air-fuel mixture from the burner plenum to a combustion chamber, 6) igniting the air-fuel mixture in the combustion chamber, the combustion of the air-fuel mixture releasing heat for the hybrid solar receiver, and 7) recirculating the heat from the combustion chamber to heat the air-fuel mixture in the burner plenum.

BRIEF DESCRIPTION OF THE DRAWINGS

The accompanying drawings, which are incorporated in and which constitute a part of the specification, illustrate at least one embodiment of the invention and, together with the description, explain the principles of the invention.

DESCRIPTION OF THE PREFERRED EMBODIMENT

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, examples of methods and materials are now described.

The high-temperature hybrid heat-pipe solar receiver according to the subject invention simply, inexpensively, and efficiently heats a solar sodium heat-pipe receiver, using combustion of fossil fuel, so that the receiver continues to supply heat to an engine, even when the sun is not available. The invention herein includes a very effective recuperator, attaining a high pre-heat temperature, of about 640° C. to 675° C., without pre-ignition and because it is compact and tightly-integrated, minimizing heat and pressure losses. A gas-fired efficiency of 75% is achievable, with overall pressure losses of about 5,800 Pa (pump parasitics~650 W). It is less expensive than existing technology, because it is simple and can be manufactured using common inexpensive materials and methods.

Figure 1:
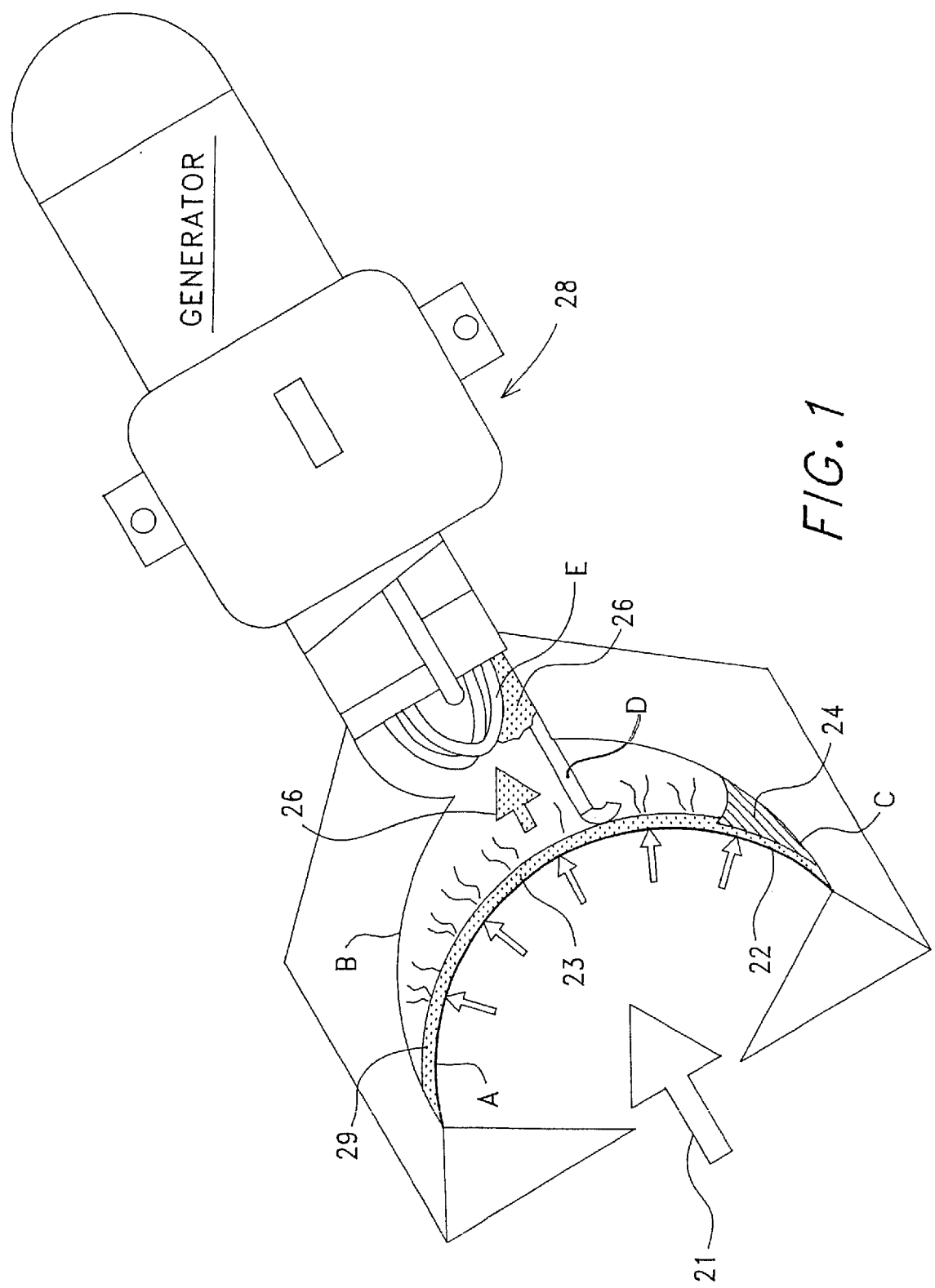
FIG. 1 is an illustration of a hybrid solar fossil fuel receiver according to one embodiment of the invention showing the solar receiver, heat engine and generator.

Referring now to the drawing figures, wherein like numerals refer to like elements, the elements of the invention are divided into two categories: solar heat-pipe-receiver parts; and combustion-system parts. An example of the solar heat-pipe-receiver parts is shown in FIG. 1. In the figure, the solar heat-pipe-receiver comprises a front dome (A), having an absorber surface 22 for receiving concentrated solar energy 21, with its wick 29, a rear dome (B), sidewalls (C) joining the front dome (A) and rear dome (B), and vapor tube and return liquid tube (D) connecting to an engine 28. Sodium liquid in the wick 29 is heated via the energy flux at the absorber surface 22 from the concentrated solar energy 21. Sodium liquid in the wick 29 is thereby vaporized, and sodium vapor heats engine heater tubes (E) which drives engine 28. Sodium pool 24 results from condensation of sodium vapor 26 at engine heater tubes (E). These parts are incorporated into the combustion system to form the improved hybrid receiver according to the subject invention.

Figure 2:
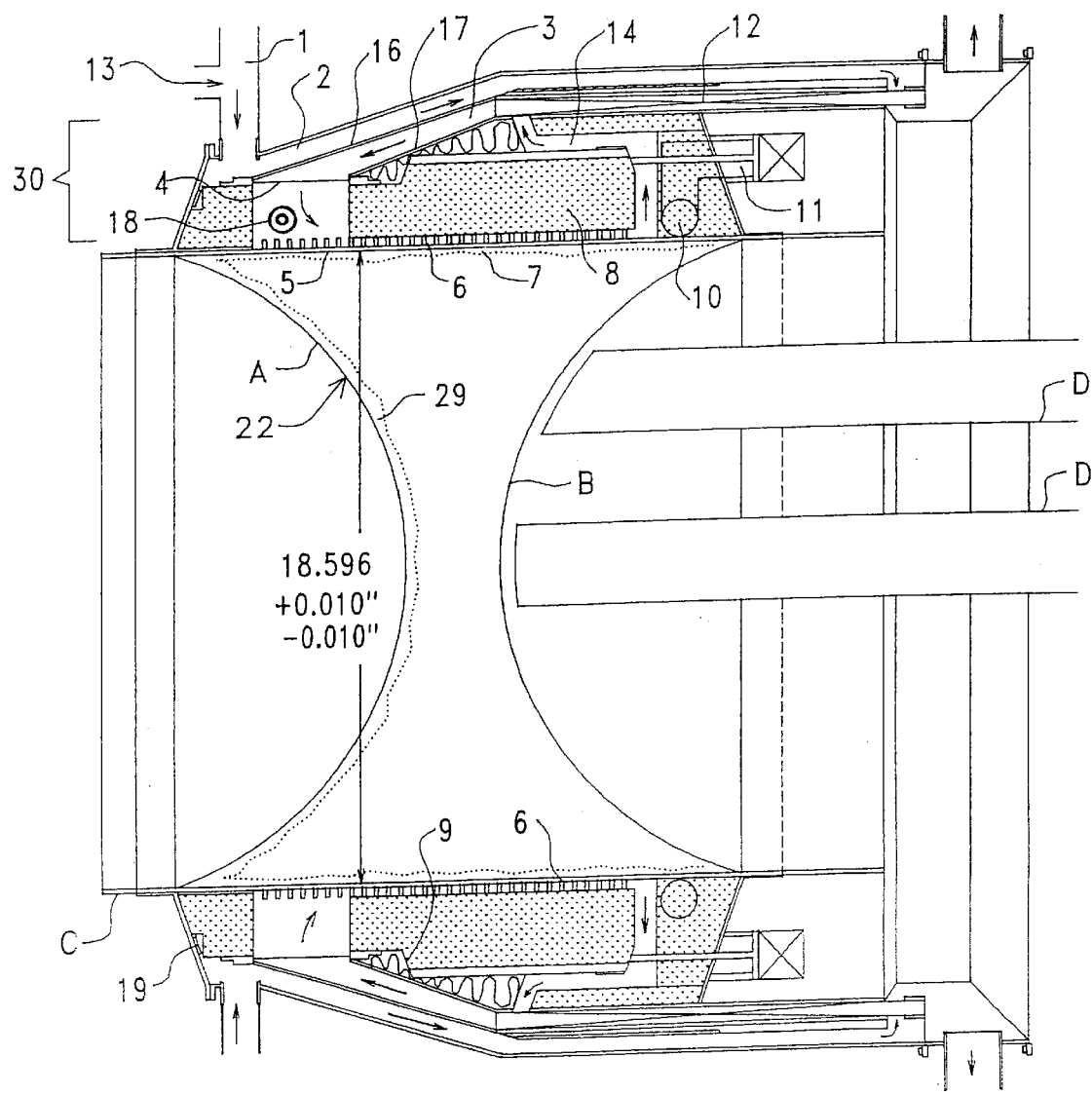
FIG. 2 is a cross-sectional view in elevation of the combustion system of the hybrid solar fossil fuel receiver illustrated in FIG. 1.

In FIG. 2, the combustion system 30 comprises fuel pre-mixers 1, and outer cooling jacket 2, a burner plenum 3, a porous burner matrix 4, a fossil-fuel heat-input surface 5 added to the receiver (outer surface covered with a pin-fin array 6, inner surface covered with an extension of the existing heat-pipe wick 7), a composite refractory-ceramic-fiber (RCF) pin-fin shroud 8, a spring-loaded end seal 9, a flue-gas diversion tube 10 and a flue-gas valve 11, and a recuperator 12. These elements themselves offer several advantages, and a number of subtle inter-relationships allow their integration into the efficient, simple, cost-effective receiver according to the invention herein, that can function without pre-ignition of the pre-mixed air and fuel.

Air and fuel are thoroughly mixed by introducing the fuel 13 into turbulent air streams well upstream of the receiver cooling jacket 2. The mixed air and fuel is introduced into the cooling jacket 2, tangentially, to promote even flow in this passage. The flow in this passage directly cools the burner plenum outer wall 16, and indirectly cools its inner wall 17, inhibiting pre-ignition in the plenum 3. The air/fuel is ignited downstream of the burner matrix 4, using a hot-surface or spark igniter 18. Some of the heat of combustion raises the temperature of the downstream surface of the burner matrix 4, causing it to radiate heat, at approximately 1,100° C. to the receiver side-wall C. The combustion products flow through the pin-fin array 6, giving up further heat to the receiver, and then flow through the recuperator 12 at approximately 830° C., giving up additional heat to the system. Using these design parameters, a sodium vapor temperature of about 750° C. can be achieved in the receiver. The flue-gas diversion tube 10 and flue-gas valve 11 are used at off-design conditions to limit the temperature of the pre-heated air and fuel, preventing pre-ignition.

The invention herein uses the metal matrix burner 4 in unique ways, including firing radially inward, facing a 750° C. sink, and using air/fuel pre-heated to 640° C. The pre-mixed metal matrix burner is desired based on its potential for low $No_x$ emissions, compactness, high turndown, and a wide range of air/fuel ratios. Because this type of burner has the potential for pre-ignition, especially when used with a recuperator, the invention is carefully designed to include cylindrical matrix burner 4, an extended-surface primary heat exchanger 19, a refractory-ceramic-fiber heat-exchanger shroud 8, and a finned recuperator 12. The inside surface of the heat exchanger 19 is lined with an extension of the absorber's heat-pipe wick 7.

A perforated Fecralloy fiber sheet, such as Bekitherm AC 200 P1, N. V. Acotech Zwevegem, Belgium, can be rolled to form the cylindrical burner assembly. A backer-strip of the same material can be spot-welded over the seam on the non-burner side. The cylinder 4 is supported by the burner plenum 3, which is welded closed around it. In order to eliminate hot spots on the matrix, the flow through the matrix 4 is made more uniform by introduction of the air and fuel mixture axial from the recuperator 12 into the air fuel plenum 3 with plenum outer wall 16 and plenum inner wall 17 diverging at approximately 4 degrees in order to eliminate recirculation within the plenum.

The cylindrical RCF (80% alumina/20% silica) pin-fin shroud 8 is a composite structure: the inner cylinder desirably comprised of a medium-density alumina/silica that is a good high-temperature insulator, while the outer cylinder is a stronger, denser material with low permeability. The permeability of the medium-density RCF pin-fin shroud 8 ensures that flue-gas by-passing of the pin fins 6 will be <2% of mass throughput. It is sealed to the burner plenum 3 using RCF paper gaskets.

The inherently-low heat flux from flue gas to receiver means that a large heat transfer surface area is required. Since receiver size is limited by wick pumping height, the area must be compact (i.e., finned). The pipe evaporator can be a Haynes Alloy-230 18.75-inch diameter tube, 22 inches long. A stud-welded pin-fin gas-fired surface is feasible and cost-effective. This design is characterized as having acceptable thermal stress, tip temperature, and pressure loss. They can also be applied inexpensively using a high-speed automated stud welder. The hybrid-receiver of the present invention is carefully designed to avoid pre-ignition due, in part, to thermal conduction from the combustion zone to the inner wall of the plenum. This can produce temperatures high enough to initiate combustion. Radiative transport from the inner 17 to outer 16 plenum walls is thereby used to eliminate this problem, in conjunction with sufficient cooling of the outer wall 16.

The heat-pipe wick 29 can be selected from a nickel-powder wick, such as a sintered nickel-powder wick, Thermacore, Lancaster, Pa., or a higher-performance metal-felt wick.

The invention provides a high sodium-vapor (sink) temperature, which is necessary to realize the high-efficiency potential of Stirling engines. The high sink temperature limits the amount of heat that can be transferred, necessitating the recuperator 12 to achieve the goal of 75% gas-fired efficiency.

Turning now to the flue-gas diversion tube and valve (10 and 11, respectively), the purpose of these parts is to limit the preheat temperature and thus prevent pre-ignition when the combustion system is operated at reduced firing rates. At reduced firing rates, the effectiveness of the recuperator 12 naturally increases, increasing the preheat temperature. This increase can be prevented by diverting a small fraction of the combustion products leaving the primary heat exchanger, so that they do not pass through the recuperator, but rather flow directly out of the system and into the atmosphere. This can be accomplished automatically, if desired, using a valve actuator controlled by an automatic-control unit that compares the preheat temperature measured by a temperature sensing means, such as a thermocouple or RTD, with a set-point temperature.

While the present invention has been described and illustrated in detail, it is clearly understood that the same is by way of illustration and example only and is not to be taken by way of limitation, the spirit and scope of the present invention being limited only by the terms of the appended claims.

What is claimed is:

1. A combustion system for a hybrid solar receiver, comprising:
   a pre-mixer having a first inlet for air and a second inlet for fuel, said pre-mixer combining the air and the fuel to form an air-fuel mixture;
   a cooling jacket open to said pre-mixer on one end, the air-fuel mixture introduced tangentially into said cooling jacket;
   a burner plenum fluidically connected to said cooling jacket, said burner plenum and said cooling jacket arranged in thermal contact with one another with the air-fuel mixture flowing through said cooling jacket cooling said burner plenum to reduce pre-ignition of the air-fuel mixture in said burner plenum;
   a combustion chamber open to said burner plenum, said combustion chamber receiving the air-fuel mixture from said burner plenum;
   an igniter positioned in said combustion chamber, said igniter combusting the air-fuel mixture, the combustion of the air-fuel mixture releasing heat;
   a recuperator operatively associated with said burner plenum and said combustion chamber, said recuperator pre-heating said air-fuel mixture in said burner plenum with heat from said combustion chamber; and
   a heat-exchanger in thermal contact with said combustion chamber, said heat-exchanger providing heat for the hybrid solar receiver.

2. The combustion system of claim 1, wherein the burner plenum has walls diverging at about 4 degrees from one another.

3. The combustion system of claim 1, further comprising a porous burner matrix between said burner plenum and said combustion chamber.

4. The combustion system of claim 3, wherein said porous burner matrix directs the air-fuel mixture from said burner plenum radially inward toward a sodium heat sink in said combustion chamber.

5. The combustion system of claim 1, further comprising a flue-gas diversion tube open to said combustion chamber, said flue-gas diversion tube removing flue gas from said combustion chamber.

6. The combustion system of claim 5, further comprising a valve actuator operatively associated with said flue-gas diversion tube, said valve actuator opening and closing said flue gas diversion tube.

7. The combustion system of claim 5, wherein said flue gas diversion tube is operable to control the temperature of the air-fuel mixture in said burner plenum.

8. The combustion system of claim 1, further comprising a shroud mounted in said combustion chamber.

9. The combustion system of claim 8, wherein the shroud is made of a composite refractory ceramic fiber (RCF) having a medium-density alumina/silica inner layer.

10. The combustion system of claim 8, further comprising a spring-loaded seal between said shroud and said burner plenum.

11. The combustion system of claim 1, wherein said recuperator has two annular passages separated by a pleated membrane.

12. A combustion system for a hybrid solar receiver, comprising:
   mixing means for combining air and fuel into an air-fuel mixture;
   intake means for receiving the air-fuel mixture from said mixing means;
   heating means for heating the air-fuel mixture after the air-fuel mixture flows through said intake means;
   delivery means for delivering the heated air-fuel mixture to a combustion chamber, said delivery means thermally connected to said intake means for cooling said delivery means;
   combustion means for combusting the heated air-fuel mixture in the combustion chamber; and
   heat-exchange means for providing heat from the combustion chamber for the hybrid solar receiver.

13. The combustion system of claim 12, further comprising porous burner means for firing said air-fuel mixture radially into the combustion chamber.

14. The combustion system of claim 12, further comprising diversion means for removing flue gas from the combustion chamber.

15. The combustion system of claim 14, further comprising means for opening and closing said diversion means.

16. The combustion system of claim 15, wherein said means for opening and closing said diversion means is operable for controlling the temperature of the air-fuel mixture in said delivery means.

17. A method for providing combustion heat for a hybrid solar receiver, comprising:
   mixing air and fuel to form an air-fuel mixture;
   tangentially introducing the air-fuel mixture for flowing through a cooling jacket;
   cooling a burner plenum with the air-fuel mixture flowing through the cooling jacket;
   heating the air-fuel mixture in the burner plenum;
   delivering the air-fuel mixture from the burner plenum to a combustion chamber;
   igniting the air-fuel mixture in the combustion chamber, the combustion of the air-fuel mixture releasing heat for the hybrid solar receiver; and
   recirculating the heat from the combustion chamber to heat the air-fuel mixture in the burner plenum.

18. The method of claim 17, further comprising providing the air-fuel mixture to flow through the burner plenum at a divergence of about 4 degrees.

19. The method of claim 17, further comprising firing the air-fuel mixture through a porous burner matrix radially inward toward a sodium heat sink in the combustion chamber.

20. The method of claim 17, further comprising removing flue gas from the combustion chamber.

21. The method of claim 17, further comprising controlling the temperature of the air-fuel mixture in said burner plenum.

* * * * *